June 3, 1969     D. E. DARNELL     3,447,388

ACTUATORS

Filed May 8, 1967     Sheet _1_ of 2

INVENTOR.
DONALD E. DARNELL
BY
Barner, Kinsella, Raisch & Choate
ATTORNEYS

INVENTOR
DONALD E. DARNELL

United States Patent Office 3,447,388
Patented June 3, 1969

---

3,447,388
ACTUATORS
Donald E. Darnell, Northville, Mich., assignor to Power Components, Inc., Dearborn, Mich., a corporation of Michigan
Filed May 8, 1967, Ser. No. 636,790
Int. Cl. F16h *19/04*
U.S. Cl. 74—29                                            12 Claims

ABSTRACT OF THE DISCLOSURE

The actuators disclosed herein comprise a housing having axially aligned openings therein communicating with the cavity within said housing. A pair of gears are positioned within the cavity. Bushings having inwardly facing flanges are positioned in the openings. Each of the gears has counterbores on opposite faces thereof, the counterbores adjacent the bushings receiving the flanges of the bushings. A retainer ring engages the juxtaposed counterbores of the gears. A rack is meshed with each of the gears and extends outwardly through openings in the housing.

---

This invention relates to actuators and particularly to actuators which convert rotational motion to linear motion such as, for example, in lifting workpieces out of a sheet metal press.

Background of the invention

It is common to utilize actuators to convert rotary to linear motion. Such actuators can, for example, be positioned in presses to act as workpiece lifters or can be arranged to operate off of a common shaft in order to simultaneously elevate a device from a plurality of spaced points.

Where it is desired to convert the rotary motion to linear motion, a pair of linearly movable devices can be used. For example, the actuator may comprise a housing having a pair of gears therein which are driven by a common shaft. A pair of racks extending at different angles from said housing are meshed with the gears so that when the shaft is rotated, the gear racks are reciprocated.

In such devices, it is common to assemble the housing and gears and thereafter insert the shaft on the job. In order to adjust the positions of the rack with respect to the gears, it is desirable that the gears be rotatable relative to one another and yet at the same time be retained in position so that the shaft can be readily inserted after the gears are rotated to the desired position.

Among the objects of the invention are to provide an actuator wherein the gears are retained in position prior to insertion of the shaft so that the gears and racks can be adjusted as desired; wherein the shaft may be readily assembled; wherein the gears may be readily reversed in their relationship to one another to equalize wear; and wherein the gears are identical in construction so that they can be readily interchanged.

Summary

The actuators disclosed herein comprise a housing having axially aligned openings therein communicating with the cavity within said housing. A pair of gears are positioned within the cavity. Bushings having inwardly facing flanges are positioned in the openings. Each of the gears has counterbores on opposite faces thereof, the counterbores adjacent the bushings receiving the flanges of the bushings. A retainer ring engages the juxtaposed counterbores of the gears. A rack is meshed with each of the gears and extends outwardly through openings in the housing.

Description

Figure 2:
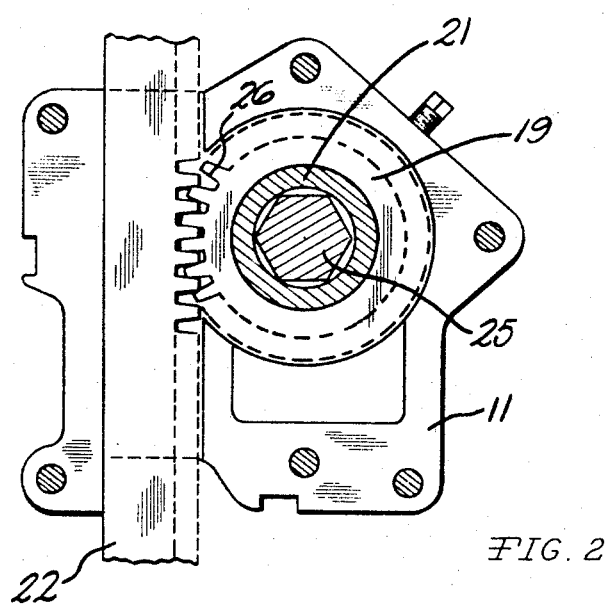
FIG. 2 is a sectional view taken along the line 2—2 in FIG. 3.
Figure 1:
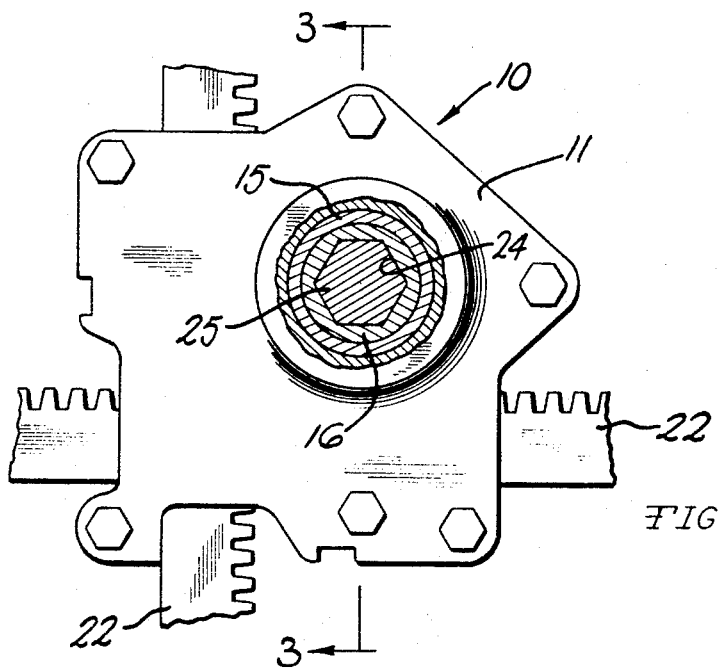
FIG. 1 is a part sectional side elevational view of the actuator embodying the invention.
Figure 3:
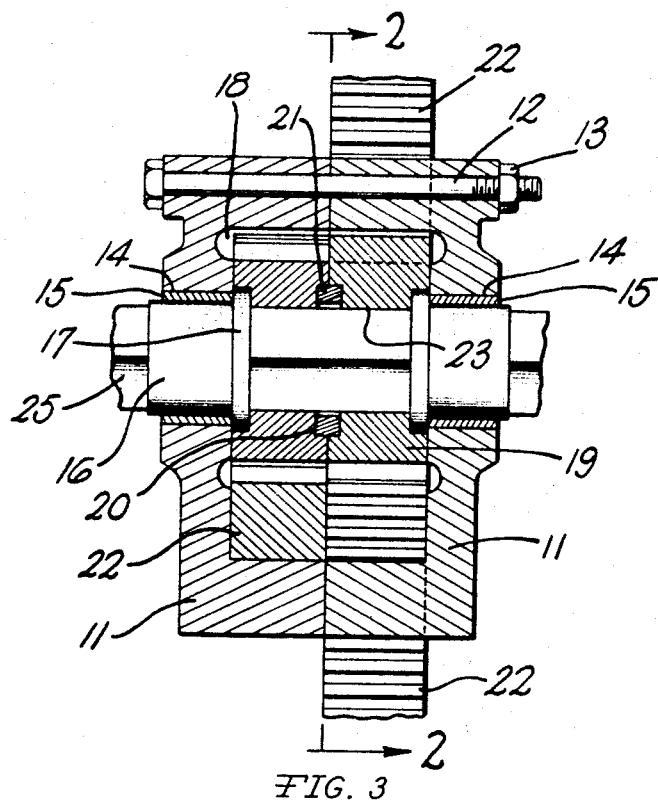
FIG. 3 is a sectional view taken along the line 3—3 in FIG. 1.

Referring to FIGS. 1-3, the actuator 10 embodying the invention comprises a housing which consists of two identical halves 11 held together by bolts 12 and nuts 13. The halves 11 include aligned openings 14 in which bearings 15 are positioned. The bearings 15 receive bushings 16 that have a cylindrical outer surface and a flange 17 at one end thereof adjacent the cavity 18 of the housing. A pair of identical gears 19 are positioned within the cavity 18. Each gear has a counterbore 20 which is adjacent the wall of the housing 11 receives and is engaged by the flange 17 of the adjacent bushing 16. The counterbores 20 of the juxtaposed faces of the gears 19 are engaged by a retainer ring 21. Gear racks 22 extend through openings in the housing halves and are meshed with the gears 19. The gears 19 and the bushings 16 have noncircular openings 23, 24, respectively, for receiving a noncircular shaft 25. As shown, the openings are preferably hexagonal in cross section. The opening in retainer ring 21 is circular. Finally, as shown in FIG. 3, when the openings 23 of the gears are in alignment, the teeth 26 of the adjacent gears may be angularly displaced.

In use, the actuator without the shaft is brought into position and mounted in accordance with the purpose for which it is to be used. The racks 22 are then reciprocated to bring them into appropriate position for the mechanism that is to be operated. During this positioning, the gears are maintained in axially aligned relationship by engagement with the bushing, flanges 17 and the retainer ring 21.

After the gear racks are adjusted, the shaft 25 is then inserted to produce the driving relationship between the shaft and the gears. By providing a polygonal opening in the gears and bushings, a minimal rotation of one gear relative to another after adjustment is required in order to align the openings 23 to receive the shaft 25. It can be appreciated that prior to insertion of the shaft 25, the gears 23 can rotate freely relative to one another to permit independent adjustment of the positions of the racks 22.

In use, each of the gears 23 can be removed and rotated 180 degrees in order to equalize any wear that might occur, that is, the counterbore 20 which receives the ring 21 can be changed so that it engages the bushing flange 17 and the counterbore that receives the bushing flange 17 will then be engaged by the retainer ring 21.

I claim:
1. In an actuator, the combination comprising
   a housing,
   said housing having a pair of aligned openings therein communicating with a cavity within said housing,
   a bushing rotatably mounted in each said opening,
   each said bushing having a flange at the internal end thereof within said cavity,
   a pair of gears within said cavity,
   each said gear having a counterbore on the opposite axial faces thereof,
   the counterbores adjacent said bushings receiving the flanges on said bushings,
   a retaining ring engaging the other counterbores which are adjacent one another.
2. The combination set forth in claim 1 including a noncircular opening through said gears.

3. The combination set forth in claim 2 including a noncircular shaft extending through said bushings and said noncircular openings in said gears.

4. The combination set forth in claim 1 wherein said bushings and said gears have non-circular openings.

5. The combination set forth in claim 4 wherein said noncircular openings are hexagonal in cross section.

6. The combination set forth in claim 1 including bearings in said openings in said housing engaging said bushings.

7. In an actuator, the combination comprising
a housing comprising complementary halves defining a cavity,
said housing having a pair of aligned openings therein communicating with said cavity within said housing,
a bushing rotatably mounted in each said opening,
each said bushing having a cylindrical flange at the internal end thereof within said cavity,
a pair of gears within said cavity,
each said gear having identical cylindrical counterbores on the opposite axial faces thereof,
the counterbores adjacent said bushings receiving the flanges on said bushings,
a cylindrical retainer ring engaging the counterbores which are adjacent one another.

8. The combination set forth in claim 7 including a noncircular opening through said gears.

9. The combination set forth in claim 8 including a noncircular shaft extending through said bushings and said noncircular openings in said gears.

10. The combination set forth in claim 7 wherein said bushings and said gears have identical noncircular openings.

11. The combination set forth in claim 10 wherein said noncircular openings are hexagonal in cross section.

12. The combination set forth in claim 10 including bearings in said openings in said housing engaging said bushings.

References Cited

UNITED STATES PATENTS

| | | | |
|---|---|---|---|
| 536,048 | 3/1895 | Schofield | 308—237 |
| 620,762 | 3/1899 | Prins et al. | 74—422 |
| 1,398,049 | 11/1921 | Swayze | 308—237 |
| 1,726,621 | 9/1929 | Hart | 74—422 |

FOREIGN PATENTS

| | | |
|---|---|---|
| 614,844 | 2/1961 | Canada. |
| 759,762 | 11/1923 | France. |

FRED C. MATTERN, Jr., *Primary Examiner.*

W. S. RATLIFF, Jr., *Assistant Examiner.*

U.S. Cl. X.R.

74—422; 308—237

PO-1050
(5/69)

UNITED STATES PATENT OFFICE
CERTIFICATE OF CORRECTION

Patent No. 3,447,388　　　　　　　　　Dated June 3, 1969

Inventor(s) Donald E. Darnell

It is certified that error appears in the above-identified patent and that said Letters Patent are hereby corrected as shown below:

In Column 2, line 19, after 'counterbore 20' add --on the opposite faces thereof. The counterbore 20--

SIGNED AND
SEALED

NOV 4 1969

(SEAL)
Attest:

Edward M. Fletcher, Jr.
Attesting Officer

WILLIAM E. SCHUYLER, JR.
Commissioner of Patents